United States Patent Office 3,380,855
Patented Apr. 30, 1968

3,380,855
BATTERY INCLUDING METHYL FORMATE
AND LITHIUM PERCHLORATE
Tyler X. Mahy and Sandors G. Abens, Philadelphia, Pa.,
assignors, by mesne assignments, to Honeywell Inc.,
Minneapolis, Minn., a corporation of Delaware
No Drawing. Filed Oct. 22, 1965, Ser. No. 502,422
10 Claims. (Cl. 136—100)

ABSTRACT OF THE DISCLOSURE

An electric current-producing cell comprising a lithium metal anode, a cathode, and an electrolyte solvent system in which the solvent consists essentially of methyl formate.

---

The present invention relates to a novel electric current-producing cell, and to a novel method of generating electric current using the same; and, more particularly, the present invention relates to an improved electric current-producing cell system in which the principal solvent is methyl formate instead of water as is the case with conventional electric current-producing cells. The invention also relates to a battery comprising two or more of such simple cells.

While water is the solvent employed in conventional cells, the use of certain organic liquids has been suggested, as in U.S. Patents 2,597,451; 2,597,452; 2,597,453; 2,597,454; 2,597,455 and 2,597,456. The use of liquid ammonia has also been disclosed (see, for example, U.S. Patent 2,863,933).

The principal object of the present invention is to provide a novel improved electric current producing cell.

Another object of the present invention is to provide an electric current-producing cell employing a non-aqueous solvent and capable of use over a wide temperature range down to well below the freezing point of water.

A further object of the present invention is to provide an electric current-producing cell, employing a highly active anode metal-lithium, capable of providing a good range of temperature performance at drain rates up to about 10 milliamperes per square centimeter.

Still another object is to provide an improved electric current-producing cell capable of high energy output per unit weight.

These and other objects, including the provision of a novel method of generating electric current, will become apparent from a consideration of the following specification and the claims.

The novel electric current-producing cell of the present invention consists essentially of a lithium metal anode, a cathode and an electrolyte solvent system in which the solvent consists essentially of methyl formate.

The present cell may or may not be of the deferred action type depending upon whether one or more of the elements is held out of contact from the others until the time of activation. In this connection the present invention is not concerned with the details of construction of the cell, and the principles of the present invention may be utilized by those skilled in the art to construct any type of current-producing cells—the present invention being based essentially on the use of methyl formate as solvent for electric current-producing cell systems, with a lithium metal anode and a suitable cathode material.

The solvent of the electrolyte of the present cell consists essentially of methyl formate. To render it electrically conductive, lithium perchlorate is dissolved therein. While the concentration of lithium perchlorate may vary widely to provide a conductivity of at least about $10^{-3}$ ohms$^{-1}$ cm.$^{-1}$, it is advisable to have a concentration of at least about 1 gram thereof per 100 ml. of methyl formate, and the concentration may go up to saturation. Generally, a concentration of from about 2 to about 60 grams/100 ml. will be found to be satisfactory, preferably at least about 10 grams/100 ml.

The anode will be essentially lithium metal. The lithium may be associated with another metal, such as in alloy form with a less active metal if reduced activity is desired, or in contact with another metal structure, such as a nickel or silver screen, which serves as the anode conductor.

The cathode (which will be a depolarizing cathode) is the site of the reduction reaction and requires a material that is reducible electrochemically (often referred to as the "depolarizer") and a cathode conductor. The cathode material should have a potential (open circuit) at least about 1 volt less than that of the anode.

Suitable cathode materials (depolarizers) are salts of metals like silver, mercury, copper, lead, nickel and cobalt. Examples of such salts are mercuric sulfate, mercurous sulfate, silver chloride, cupric fluoride, cupric chloride, cobaltous chloride, cobaltous fluoride, nickelous chloride, nickelous fluoride, manganese trifluoride and the like. The cupric salts are presently preferred, especially the halides. Various oxides suggest themselves as being useful, like mercuric oxide, silver oxide, silver peroxide, chromic anhydride, manganese dioxide and the like. The cathode material is advantageously mixed with a finely-divided conductive material, like carbon black or nickel flake, to render the mixture conductive. In addition, materials like paper fibers, asbestos fibers and cellulose acetate may be incorporated in the mixture to act as binders.

A suitable cathode conductor may be prepared from carbon, silver, copper, platinum, nickel or any other electrically conductive material inert to the electrolyte in contact therewith.

As will be apparent to those skilled in the art, two or more cells may be associated and connected together electrically to provide a battery.

The invention will be more readily understood from a consideration of the following specific examples which are given for the purpose of illustration and are not intended to limit the scope of the invention in any way.

Example 1

Sheet lithium metal is pressed into a nickel screen and this is cut into squares 1½" x 1½", and wire leads are attached. The resulting assemblies are used as anodes. Squares of blotting paper (1½" x 1½" x 1/16") serve as separators. A plastic mixture of 12 parts by weight of $CuF_2$, 1 part of paper pulp and 1 part of graphite wet with heptane is pressed into squares (1½" x 1½") of nickel screen and dried. Wire leads are attached. The resulting assemblies are used as cathodes.

A sandwich is made from two anodes, two separators and one cathode in the order: anode/separator/cathode/ separator/anode. This sandwich is placed in a small polyethylene bag of a size to provide a tight fit and to hold the assembly in the stated sandwich form. The bag is heat sealed with only the wire leads protruding. The total weight of the cell is 20 grams.

The cell is then connected in a circuit with a 10 ohm load, and activated by injecting into the bag a solution prepared by dissolving 50 grams of lithium perchlorate in 100 ml. of methyl formate. Operating at room temperature, the voltage is monitored with time with the following results:

| Hours: | Voltage |
|---|---|
| 1 | 2.4 |
| 2 | 2.3 |
| 3 | 2.3 |
| 4 | 2.3 |
| 5 | 2.3 |
| 6 | 2.2 |
| 7 | 2.2 |
| 8 | 2.1 |
| 9 | 2.0 |
| 10 | 1.7 |

Example 2

A cell prepared as in Example 1 is run, under a 220 ohm load, at −70 to −92° C. with the following results:

| Minutes | Voltage | Temperature (° C.) |
|---|---|---|
| 0 | 2.62 | −80 |
| 15 | 2.60 | −80 |
| 30 | 2.56 | −80 |
| 60 | 2.56 | −86 |
| 75 | 2.40 | −89 |
| 90 | 2.36 | −92 |
| 95 | 2.46 | −79 |
| 155 | 2.54 | −70 |

Example 3

Sheet lithium metal is pressed in a silver screen and this is cut into squares 1½″ x 1½″, and wire leads are attached. These assemblies are used as anodes. Glass fiber filter mat is cut into squares 1½″ x 1½″, and these are used as separators between the anode and cathode. $CuF_2$, graphite and cellulose acetate, in proportions by weight of 20:4:0.4, respectively, are mixed, and sufficient anhydrous solvent (90% by volume ethyl acetate:10% by volume ethyl alcohol) is added to form a stiff paste. The paste is pressed into squares (1½″ x 1½″) of silver screen to a thickness of 0.025″, and wire leads are attached. The resulting assemblies, after vacuum drying at room temperature, are used as cathodes.

A sandwich is prepared from one anode, two separators, (i.e. double thickness) and one cathode in the order: anode/two separators/cathode. This sandwich is placed in a small polyethylene bag and activated, as in Example 1. When connected in a circuit with a constant current load of 317 milliamperes, the cell operates, at −15° C., for 70 minutes before the voltage drops to below 2, and the average voltage is 2.67.

Example 4

Cells are prepared and operated as in Example 3 using, however, microporous rubber sheet (0.03″ thick) in place of the two glass fiber filter mat separators. These cells operate for from 45 to 60 minutes before the voltage drops below 2, and their average voltages are 2.24–2.27.

Examples 5–6

Cells are prepared as in Example 4 using, however, other anhydrous cathode materials, as listed below, in place of $CuF_2$, and activating the cells with a solution prepared by dissolving 25 grams of lithium perchlorate in 100 ml. methyl formate. Also in these examples the cathodes are prepared by mixing 3 grams of cathode material 1.5 grams of graphite, 0.5 gram of acid-washed asbestos fibers and perchloroethylene to provide a thin slurry; suction filtering; pressing at 10 p.s.i.; drying under vacuum, and pressing into a silver screen.

Operation of the cells at −15° C. and at a discharge current of 22 milliamperes gives the following:

| Time (hrs.) | 5 | 6 |
|---|---|---|
| | $NiF_2$ | $Ag_2O_2$ |
| 0 | 1.75 | 2.75 |
| 3 | 1.25 | 2.80 |
| 6 | 1.05 | 2.75 |
| 9 | 1.05 | 2.70 |
| 12 | 1.05 | 2.72 |
| 15 | 1.05 | 2.70 |
| 18 | 1.05 | 2.67 |
| 21 | 1.00 | 2.60 |
| 24 | 1.00 | 1.90 |
| 27 | 1.00 | 1.55 |
| 30 | 1.00 | 1.35 |

Examples 7–13

The following $CuF_2$ cathode formulations have been used successfully, at a temperature of −15° C. and a current of 25 milliamperes, with a lithium anode and electrolyte solutions of lithium perchlorate in methyl formate having the indicated molar concentrations. In the following table, the figures are in percent, by weight.

| | 7 | 8 | 9 | 10 | 11 | 12 | 13 |
|---|---|---|---|---|---|---|---|
| $CuF_2$ | 64 | 80 | 74 | 64 | 64 | 70 | 70 |
| Graphite | 27 | | | | | 20 | 20 |
| Acetylene black | | 8.5 | 15.5 | 27 | | | |
| Nickel flake | | | | | 27 | | |
| Polyethylene-impregnated cellulose (50:50) | 9 | 11.5 | 10.5 | 9 | 9 | | |
| Paper pulp | | | | | | 10 | 10 |

In Examples 7–12, the concentration of lithium perchlorate per 100 ml. methyl formate was 25 grams, and in Example 13 the concentration was 50 grams per 100 ml. of methyl formate.

Example 14

A cell is prepared as in Examples 5–6 using, however, silver chloride in place of $CuF_2$, and activating with a solution prepared by dissolving 50 grams of lithium perchlorate in 100 ml. methyl formate. The cell is discharged at a constant current of 26 milliamperes and provides about one-half ampere hour above 2 volts.

Modification is possible in the selection of materials as well as in the construction of the cell without departing from the scope of the invention.

What is claimed is:

1. An electric current-producing cell having a lithium metal anode, a cathode and an electrically conductive electrolyte consisting essentially of methyl formate including lithium perchlorate dissolved therein in an amount capable of rendering said electrolyte electrically conductive.

2. The cell of claim 1 wherein the concentration of lithium perchlorate in the electrolyte is at least 1 gram per 100 ml. of methyl formate.

3. The cell of claim 2 wherein the concentration of lithium perchlorate is from about 2 to about 50 grams per 100 ml. of methyl formate.

4. The cell of claim 3 wherein the concentration of lithium perchlorate is at least about 10 grams per 100 ml. of methyl formate.

5. The cell of claim 1 wherein the cathode has a potential at least about 1 volt less than the anode.

6. The cell of claim 5 wherein the cathode material is a cupric salt.

7. The cell of claim 6 wherein the cupric salt is a cupric halide.

8. The cell of claim 7 wherein the cupric halide is cupric fluoride.

9. The cell of claim 5 wherein the cathode material is $Ag_2O_2$.

10. An electric current-producing cell having a lithium metal anode, a cathode containing cupric fluoride and an electrically conductive electrolyte solution of lithium perchlorate dissolved in methyl formate.

References Cited

UNITED STATES PATENTS 3,279,952  10/1966  Minnick _____ 136—100

ALLEN B. CURTIS, *Primary Examiner.*

WINSTON A. DOUGLAS, *Examiner.*

C. F. LeFEVOUR, *Assistant Examiner.*

UNITED STATES PATENT OFFICE
CERTIFICATE OF CORRECTION

Patent No. 3,380,855          Dated April 30, 1968

Inventor(s) Tyler X. Mahy and Sandors G. Abens

It is certified that error appears in the above-identified patent and that said Letters Patent are hereby corrected as shown below:

Column 1, after line 5 insert the following paragraph:

The invention described herein was made in the performance of work under a NASA contract and is subject to the provisions of the National Aeronautics and Space Act of 1958, Public Law 85-568 (72 Stat. 435; 42 U.S.C. 2457), as amended.

Signed and sealed this 5th day of October 1971.

(SEAL)
Attest:

EDWARD M. FLETCHER, JR.          ROBERT GOTTSCHALK
Attesting Officer          Acting Commissioner of Patents